Patented May 4, 1937

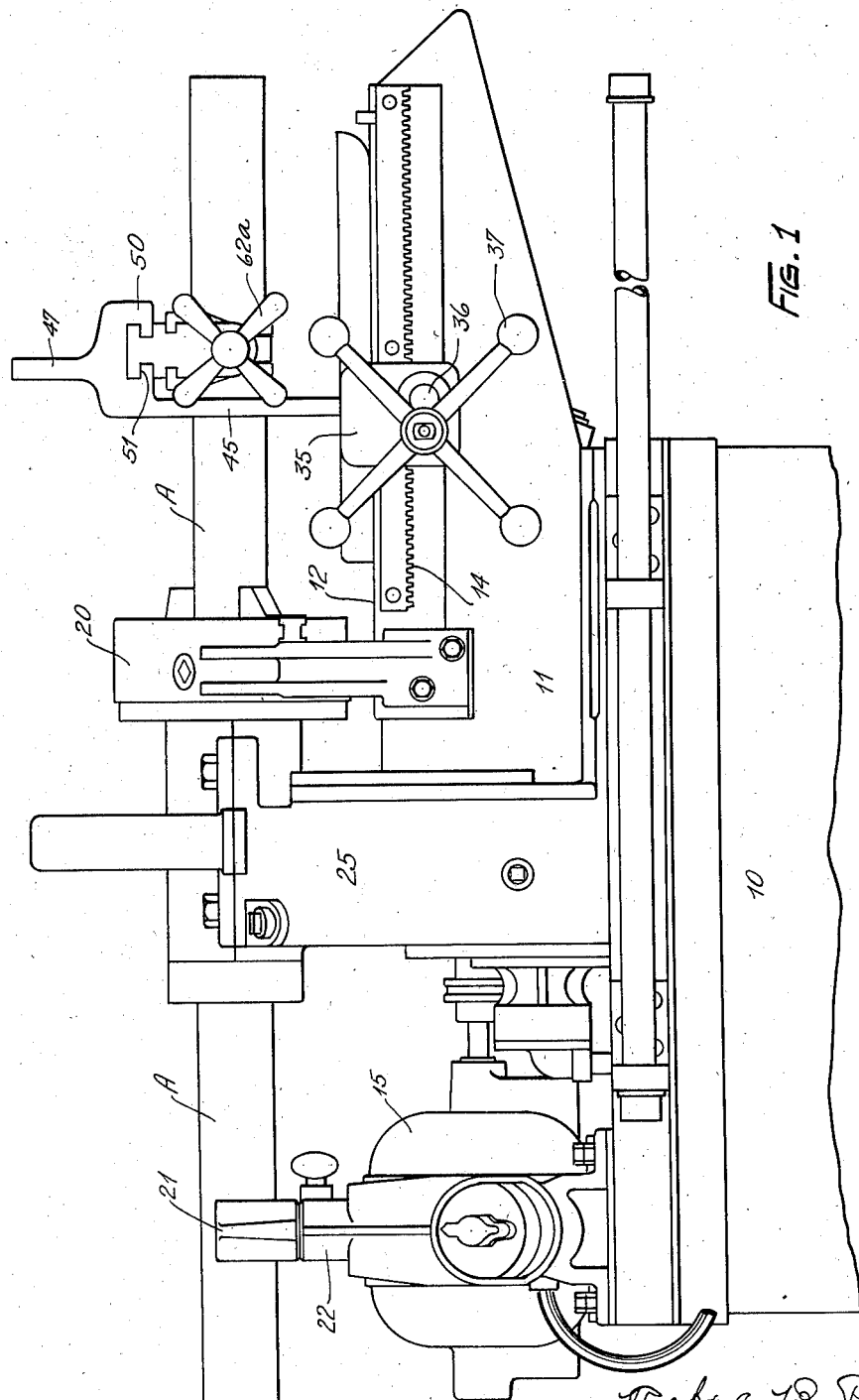

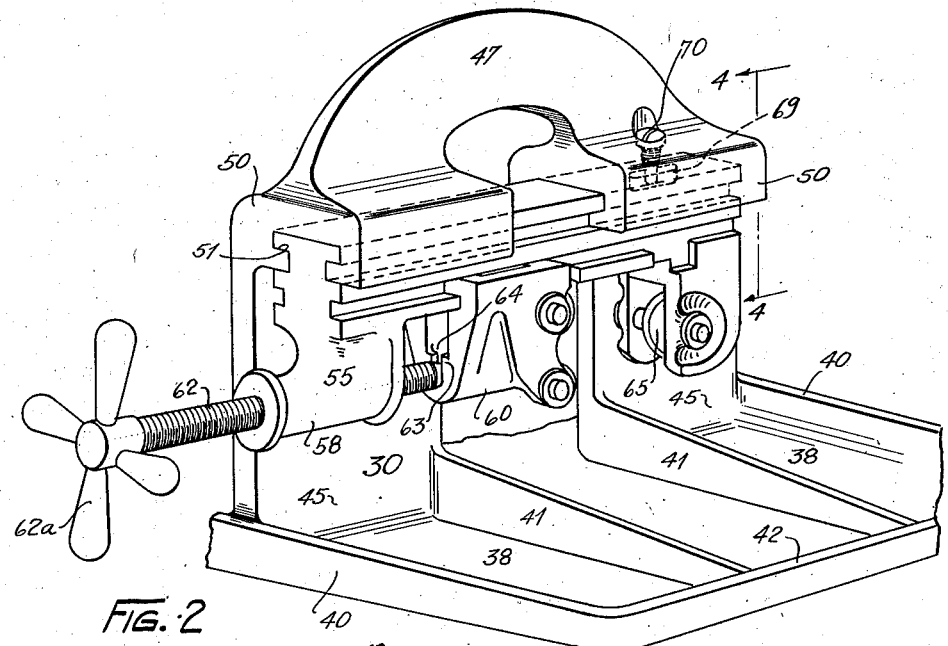
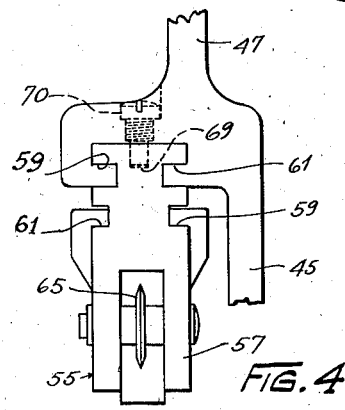
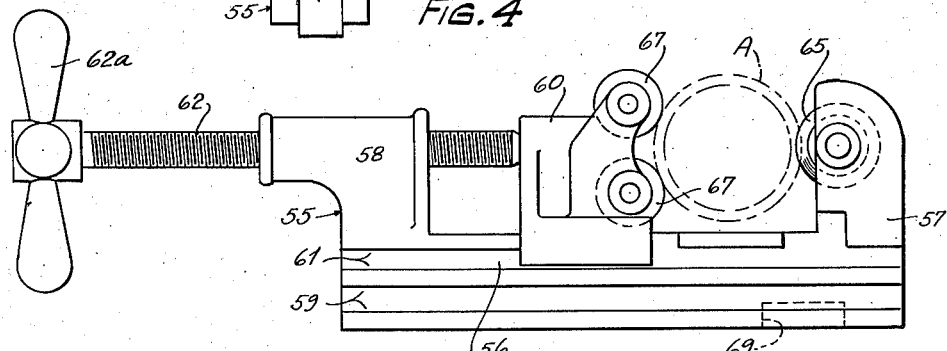

2,079,180

UNITED STATES PATENT OFFICE 2,079,180

PIPE CUTTING MACHINE

Robert B. Pealer, Warren, Ohio, assignor to Beaver Pipe Tools, Inc., Warren, Ohio, a corporation of Ohio Application April 11, 1936, Serial No. 73,898

12 Claims. (Cl. 164—60)

This invention relates to a power mechanism for performing operations on pipes and is of the type where the pipe is mounted in a chuck rotated by power and the working tool is mounted on a slidable carriage adapted for movement parallel with the axis of the pipe. More particularly, my invention is concerned with a pipe cut-off tool, adapted to be carried on such slidable carriage and which is used to sever the pipe when desired.

One of the features of my invention comprises a pipe working machine with a cutting off mechanism operating on the established principle of a cutting wheel with opposed bearing rollers, the object being to provide such feature in a form which is simple in construction, efficient in service, and durable in use.

It has been found that in pipe working machines of this general type, chips and dirt resulting from working the pipe, especially from an adjacent threading operation, accumulate rapidly and it is desirable to provide a cutting installation which is so formed that it does not interfere with the ready cleaning of the various parts of the carriage.

Still another object of my invention has been to provide a slideway in the carriage for a cut-off tool, which is protected on substantially all sides from becoming clogged with dirt and chips. This has been accomplished by providing a guideway carrying the cut-off tool which is inverted and opens downwardly and by locating such guideway above the region in which cutting and other operations on the pipe take place. This further permits a severed pipe to drop clear of the tools, because the same are supported above it.

It is sometimes necessary to perform work on a pipe or nipple of so short a length that if the same is adequately gripped by the chuck jaws, not enough protrudes to be engaged by the conventional pipe cut-off tool. It therefore has been an object of my invention to provide a cut-off tool which may be completely removed from the slidable carriage ordinarily supporting it and placed close against the chuck jaws and operated as a hand tool to effect a severing of the pipe when such short lengths are to be severed.

A further object of my invention has been the provision of a cut-off tool mount so positioned that the stresses set up by working the pipe are resisted by a cross-member surmounting the two uprights carrying the cut-off tool. If desired, this member may be used as a handle in removing the slidable carriage from the bed.

These objects and others will become more apparent from an examination of the specification following, and the drawings which are attached hereto as part of that specification. The essential features will be set forth in the claims.

Referring now to the drawings, Fig. 1 is a side elevation of my improved pipe working machine; Fig. 2 is a perspective of the sliding carriage adapted to carry the cut-off tool; Fig. 3 is a side view of the cut-off tool, showing the same in an inverted position; Fig. 4 is a fragmentary side elevation of a portion of the cut-off tool and slidable carriage, as indicated by the lines 4—4 on Fig. 2.

Certain portions of the machine set out in this application are similar to those shown, described and claimed in my prior Patent 1,947,874, issued February 20th, 1934, to my assignee, The Borden Company, now named Beaver Pipe Tools, Inc. In that patent, and also in Fig. 1 hereof, there is shown a frame here designated 10, carrying an overhanging bed 11, a driving motor 15 supported on the bed 10 and a rotating chuck 20 mounted in a hollow standard 25 which houses reduction gearing connecting the motor to the chuck. The chuck 20 is of any suitable form adapted to clamp the pipe illustrated at A, and may be aided in supporting this pipe by pipe rest 21, mounted on a standard 22, which bridges the motor.

The extension frame 11 is an open, trough-like member, having a pair of rails 12 on each side thereof extending parallel with the axis of a pipe mounted in the chuck. A rack 14 may be provided on the side of the frame 11 to facilitate movement of the carriage carried by the guide rails 12 back and forth across the machine.

The carriage, which is slidable on the rails 12 of the bed 11, is shown in Fig. 2 and indicated generally at 30. Secured to the carriage 30 is a bracket 35 supporting a pinion 36 adapted to rotatably engage the rack 14. A hand wheel 37 is shown for driving the pinion 36 and thus effects, by its rotation, the movement of the carriage 30 back and forth across the bed 11.

The carriage proper is preferably a casting formed of one piece of material, including a substantially horizontal portion and two upright plate-like posts 45 transversely aligned. The carriage and posts are braced by suitable upright webs integral with the carriage and the posts, namely, the edge webs 40 and the intermediate webs 41, all of which terminate in an end web 42. This construction provides two tray-like portions 38, which are useful for carrying tools.

At the top of the posts are heads 50, preferably formed integral with the posts and extending substantially the same width as the posts and projecting therefrom toward the end of the carriage. These heads and the posts are braced by a further portion of the casting comprising a cross-member 47 which extends in an arch from one head to the other and may be utilized as a handle for lifting the carriage. A pair of aligned T-shaped slots 51 are formed in the respective heads opening downwardly, as shown in Fig. 2, and thus provide an effective slideway and support for the pipe cutting mechanism about to be described.

The pipe-cutting mechanism, indicated at 55, is carried by the T-slots 51 and is substantially similar to an ordinary hand pipe-cutter, except as to its frame. As shown in Fig. 3, it comprises a stock 56 with a fixed cutter support 57 and a threaded bearing 58 at opposite ends of the stock. Two pairs of recessed channels 59 and 61 are provided in the stock, as shown, in Figs. 3 and 4. The inner pair of channels 61 slidingly support an adjustable jaw 60, which is moved back and forth in the channels by a screw 62 threadingly carried in the socket 58 and secured in the jaw 60 in recess 64, behind the flanges 63, shown in Fig. 2. A freely rotatable cutting wheel 65 is carried in the fixed support 57. The jaw 60 supports a pair of freely rotatable pipe rollers 67 mounted with respect to the cutter 65 to provide a triangular support for a pipe A carried between them. It is thus apparent that as the hand wheel 62a is rotated in a clockwise direction, the rollers 67 and the cutter 65 will be brought together, thus severing a pipe A passing between them.

The cutter 55 is slidably carried in the T slots 51 of the carriage 30. The pair of channels 59 form a T head on the stock 56 which is embraced by the T slots 51 in the heads 50, to provide means for slidably supporting the pipe cutter. An elongated recess 69 in the stock 56 of the pipe cutter is engaged by a screw 70, carried in the head 50, and thus accidental removal of the cutter from the heads is prevented, while the complete cutter is free to move as a unit.

This method of supporting the cutter enables it to adapt itself to all sizes of pipe within the range of the machine. The hand wheel 62a having been rotated to spread the rollers and cutting wheel, the same handle enables the manual shifting of the entire unit in one direction or the other to approximately center it on opposite sides of the pipe. Then as the hand wheel is rotated to bring the cutting wheel and bearing rollers into engagement with the pipe, the cutter frame shifts bodily in its slide to obtain the desired equalized pressure on the pipe and maintain the same throughout the cutting operation, which is effected by turning the handle 62a as the pipe is rotated. This free movement of the cutter frame accordingly takes care of any inaccuracy either in the circular contour of the pipe or slight bending of its axis. The slight orbital movement of a bent pipe is compensated for as to its horizontal deflections by the shifting of the cutter frame forwardly and backwardly and as to its vertical deflections by the pipe riding slightly up or down on the rollers and cutting wheel.

As heretofore stated, it is frequently desirable to cut off a very short length of pipe adjacent the jaws of the chuck 20 and this is often impossible while the pipe cutter is carried in the slidable carriage. To effect such cutting off operation it is merely necessary with my invention to remove the screw 70 and withdraw the pipe cutter 55 from the T slots and use the same as an ordinary hand pipe cutter as close to the chuck jaws as necessary.

I claim:

1. In a pipe working machine, the combination of a frame, a chuck rotatably carried thereby, means for rotating the chuck, a carriage slidably mounted on the frame, a pipe cutter partially encircling the pipe axis and having a rigid frame with a rigid arm and a block carried solely by the pipe cutter frame and slidably mounted thereon, the arm and block carrying a cutting wheel and roller, and a slideway on the carriage on opposite sides of the pipe axis but at an elevation different therefrom, said pipe cutter frame being slidably mounted in said slideway and supported solely thereby bridging one region of the pipe and supporting the wheel and roller against two opposed regions of the pipe while leaving a fourth region of the pipe exposed.

2. In a pipe working machine, the combination of a frame, a chuck rotatably carried thereby, a carriage slidably mounted on the frame, upright standards rigid with the carriage on opposite sides of a region adapted to be occupied by a pipe in the chuck, a downwardly facing slideway carried by the standards above the pipe axis and a depending pipe cutter, including a rigid frame carrying a set of cutting tools relatively movable thereon, said frame being slidably mounted at its top in the slideway and supported entirely thereby.

3. The combination of a frame, a rotatable chuck carried by the frame, a carriage movable on the frame, a pair of posts rigidly carried by the carriage, standing respectively on opposite sides of a chuck axis to allow the passage of a pipe between the standards, a pair of horizontally extending heads carried by respective standards above the said chuck axis, and a self-contained pipe working tool slidably suspended on the underside of said heads to coact with the pipe when positioned as aforesaid.

4. The combination of a frame, a rotary chuck, a carriage shiftable toward and from the chuck, a guideway on the frame disposed entirely on one side of the axis of a pipe located in the chuck, a pipe-cutting device slidably mounted in said guideway comprising a frame carrying a cutting wheel and an opposing roller arranged fully to expose the pipe in a direction which is away from the guideway, and means for feeding the roller and the cutter toward each other.

5. In a pipe working machine, the combination of a frame, a chuck rotatably carried thereby, means for rotating the chuck, a carriage slidably mounted on the frame, said carriage having a pair of rigid upright posts respectively located in front of and behind the chuck axis in a common plane, a head carried by each post offset from said plane, aligning grooves in that face of the two heads which is toward the pipe axis, and a pipe cutter having a rigid continuous frame disposed adjacent the posts and having a rib occupying said aligned grooves, whereby the frame may shift transversely of the pipe axis, and a cutting wheel and cooperating abutment carried by said shiftable frame on substantially opposite sides of the pipe.

6. In a pipe working machine, the combination of a frame, a chuck rotatably carried by the frame, a carriage slidable on the frame, a pair of upright posts on the carriage, disposed on opposite sides of the chuck axis and having a guideway, and a pipe cutter comprising a stock slidable on the guideway, an arm rigidly carried by said stock, a block slidably carried by said stock independently of said guideway and spaced from said posts, a cutting wheel and a roller carried by said stock and arm, and means to move said cutting wheel and said roller toward each other.

7. In a pipe working machine, the combination of a frame, a chuck rotatably carried thereby, a carriage slidably mounted on the frame, upright posts rigid with the frame on either side of the chuck axis, and a pipe cutter comprising a stock with a pair of guideways therein, one of said guideways slidably engaging said heads, a member slidable in the other of said guideways, an arm rigid with said stock, a cutter and a roller carried by the arm and the slidable member, and means to move the arm and the slidable member toward each other.

8. In a pipe working machine, the combination of a frame, a chuck rotatably carried by the frame, a carriage mounted on the frame, a guideway on the carriage, a pipe cutter having a C-shaped frame, the intermediate portion of said frame slidably engaging said guideway, a block slidably mounted on said intermediate portion of the C-shaped frame, a cutting wheel and roller, one carried by the block and the other by one of the arms of the C-shaped frame, and a screw threaded shaft carried by the other arm of the C-shaped frame and acting on the block.

9. In a pipe working machine, the combination of a frame, a chuck rotatably carried by the frame, a carriage mounted on the frame, a pair of upright standards rigid with the carriage aligned T slots in the upright standards, one in front of and the other behind the pipe axis and both out of the horizontal plane through the axis, and a pipe cutter having a C-shaped frame, the intermediate portion of said frame having a rib slidably occupying said T-slot, a block slidably mounted on said intermediate portion of the C-shaped frame, a cutting wheel and roller, one carried by the block and the other by one of the arms of the C-shaped frame, and a screw threaded shaft carried by the other arm of the C-shaped frame and acting on the block.

10. In a pipe working machine, the combination of a frame, a chuck rotatably carried thereby, means for rotating the chuck, a carriage slidably mounted on the frame, upright standards rigid with the carriage on opposite sides of a region adapted to be occupied by a pipe in the chuck, heads projecting from said upright standards, a pair of aligned T slots opening downwardly and carried by respective heads and positioned above the axis of a pipe in the chuck, a pipe cutter carried in said T slots and depending therefrom, and a cross-beam surmounting the two heads and rigidly connected therewith and adapted to directly absorb stresses set up by the pipe cutter.

11. In a pipe working machine, the combination of a frame, a chuck rotatably carried by the frame, a carriage slidably mounted on the frame, a guideway in said carriage, a pipe cutter having a rigid frame slidably mounted in said guideway, a recess in said cutter frame which is elongated in a direction parallel with said guideway, a removable member carried by said carriage and adapted to enter said recess to limit the sliding movement of said cutter frame, a block slidably mounted on the cutter frame, and a cutting wheel and opposing roller carried by said block and cutter frame.

12. In a pipe-working machine, the combination of a frame, a chuck rotatably mounted on said frame, a carriage slidably carried by said frame, a pair of upright posts carried by said frame and adapted to stand on opposite sides of a pipe carried in said chuck, a pair of horizontally extending heads mounted on respective posts, T slots in said heads in alignment with each other and opening downwardly, a pipe-cutting tool adapted to be slidably carried in the T slots comprising a stock having two pairs of parallel channels extending lengthwise of the stock, one of said pair of channels cooperating with the T slots to support said pipe cutter, a member movable on said stock supported by the other pair of channels, an arm at one end of the stock and rigid therewith, a post on the opposite end of said stock and rigid therewith, a threaded member engaging the post just mentioned and operatively secured to said movable member, and a pipe cutting wheel and a pair of pipe-bearing rollers carried by said movable member and said arm and adapted to be moved toward each other by said threaded member.

ROBERT B. PEALER.